Figure 2:
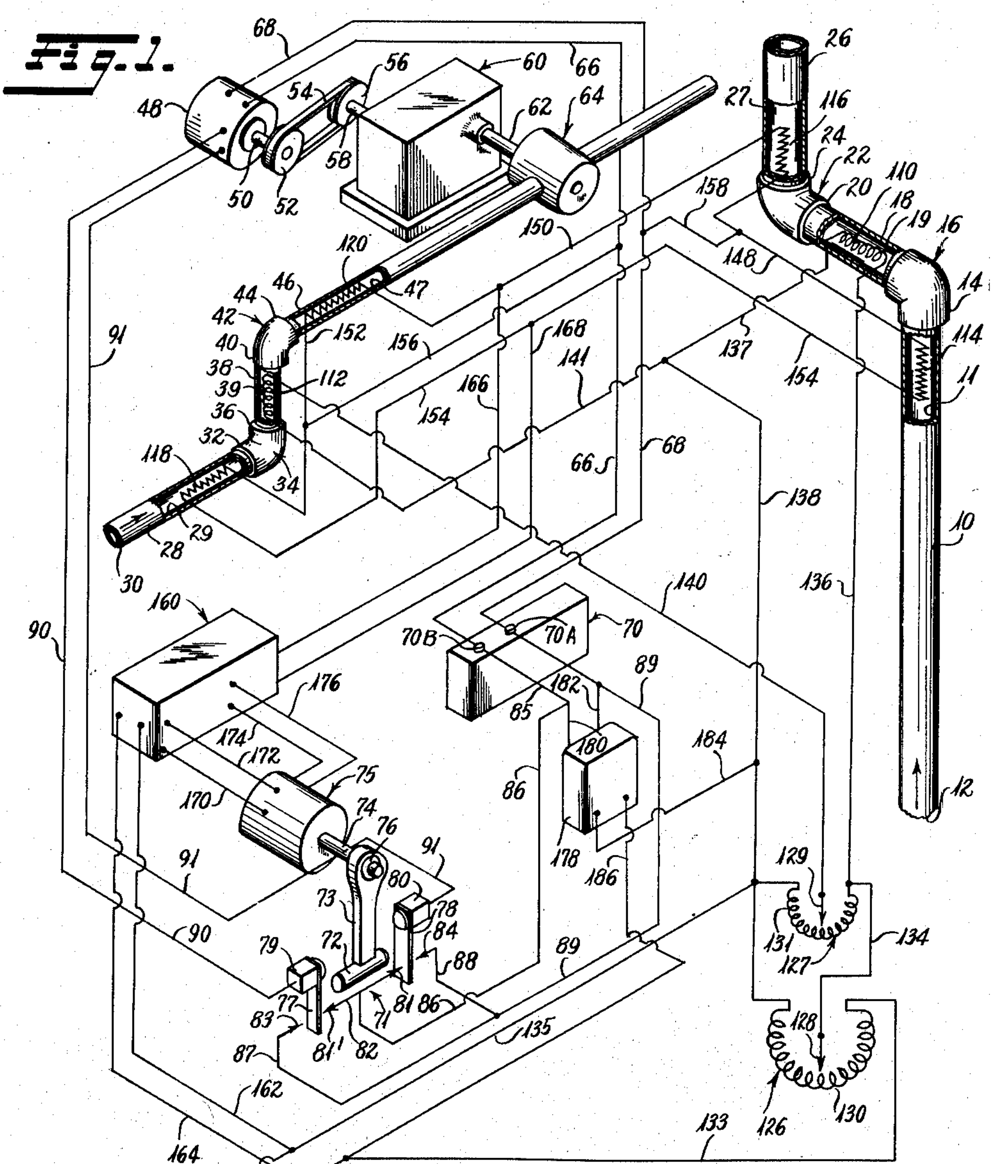

March 1, 1960 J. B. REPLOGLE 2,926,684

FLUID FLOW PROPORTIONING DEVICE

Filed Aug. 2, 1956

60~AC
115 V

AMPLIFIER

INVENTOR

*James B. Replogle*

BY *Bacon & Thomas*

ATTORNEYS 2,926,684

FLUID FLOW PROPORTIONING DEVICE

James B. Replogle, Waukegan, Ill., assignor to Benjamin Clayton, Houston, Tex.

Application August 2, 1956, Serial No. 601,830
8 Claims. (Cl. 137—101.19)

This invention relates to fluid flow proportioning apparatus, and more specifically, the invention pertains to electrical means for maintaining a constant rate of flow of a fluid in a given conduit with respect to the rate of flow of a second fluid in a second conduit.

One of the primary objects of this invention is to provide electrical control apparatus of the thermal-responsive type for maintaining a constant rate of flow of one fluid with respect to the rate of flow of a second fluid.

Another object of this invention is to provide thermal-responsive electrical control apparatus for energizing a servomotor, the drive shaft of the latter being connected with a reversing switch disposed in an electric circuit including means for adjusting the rate of flow of a fluid in one conduit with respect to the rate of flow of a second fluid in a second conduit.

A further object of this invention is to provide thermal-responsive electrical control apparatus including a pair of temperature-sensing coils for a pair of conduits, the coil being connected in an electrical circuit to detect differentiations of the rate of flow of the fluids in the pair of conduits with respect to their respective norms, the circuit including electrically-operable valve control means for one of the conduits.

A still further object of this invention is to provide thermal-responsive electrical control apparatus including a pair of temperature-sensing coils as referred to above disposed in each of the conduits, together with electrical means disposed in each of the conduits for heating the fluids, and means to prevent heat of radiation derived from the heating means from affecting the temperature of the sensing coils.

This invention contemplates, as a still further object thereof, the provision of thermal-responsive control means of the type described in combination with heating elements, and including variable transformer control devices for the elements which permit separate and independent adjustments to effect the desired proportion of the rate of flow of the fluids in the conduits, the transformer control devices being employed to effect high efficiency of operation in the heating circuits.

This invention has, as another object, the provision of thermal-responsive control means, of the type to which mention has been made, in combination with heating elements and means for shielding the control means from heat radiated by the heating elements.

Other and further objects and advantages of the instant invention will become apparent from a consideration of the following specification, when read in conjunction with the annexed drawing, in which:

Fig. 1 represents a circuit diagram of a control system embodying certain features of the present invention; and Fig. 2 is a partial circuit diagram illustrating the Wheatstone bridge connection of the sensing coils illustrated in Fig. 1.

The present invention is especially directed to the provision of control apparatus utilized in the proportioning of crude oil with respect to caustic soda or other reagent in the refining and re-fining of fatty oils and will be described with respect thereto. Referring now more specifically to Fig. 1, reference numeral 10 designates a conduit having a saran lining 11 and an inlet end 12 connected with a source of crude oil (not shown). The discharge end of the conduit 10 is connected to one end 14 of an elbow connector 16 having its other end connected with one end of a pipe section 18 having a saran lining 19, and the pipe section 18 has its other end connected to one end 20 of a second elbow connector 22. The other end 24 of the connector 22 is connected with one end of a crude oil discharge conduit 26 having a saran lining 27. In Figure 1, the angle between the conduit 10 and the pipe section 18 is preferably 90°, and the same is true with respect to the angle between the pipe section 18 and the discharge conduit 26.

Reference numeral 28 denotes a conduit having a saran liner 29 and having one of its ends 30 connected with a source of caustic soda. The other end of the conduit 28 is connected with one end 32 of an elbow connector 34, the latter having the other of its ends 36 connected with one end of a pipe section 38 having a saran liner 39. The other end of the pipe section 38 is connected to one end 40 of an elbow connector 42, and the other end 44 of the connector 42 is connected to one end of a discharge conduit 46 for the caustic soda, the conduit 46 having a saran liner 47. The angle between the conduit 28 and the pipe section 38 is preferably 90°, and the same is true of the angle between the pipe section 38 and the discharge conduit 46.

It is to be understood that while the angularity between the several conduits and pipe sections has been described as being a right angle, the degree of the angularity may vary depending upon the character of the usage of the proportioning apparatus, and that in any event the described angles must be greater or smaller than 180°. The purpose for disposing the conduits and pipe sections at the described angles will become apparent below.

A D.C. shunt-wound reversible motor 48 (energized by a circuit to be described) is provided with a drive shaft 50 on which is mounted a drive pulley 52 connected in driving relation by an endless belt 54 to a pulley 56 mounted on the power input shaft 58 of a conventional speed-reducing unit 60. The power take-off shaft 62 is connected in driving relation with a conventional valve 64 disposed in the discharge conduit 46.

The reversible motor 48 has its field coil (not shown) constantly energized through wires 66, 68 which connect with a twelve volt battery 70.

A reversing microswitch is designated, in general, by the reference numeral 71 and is seen to comprise an operating lever 72 fixedly secured to one end of an arm 73 having the other end thereof mounted on the drive shaft 74 of a servomotor 75 through a friction clutch ring 76. The lever 72 is seen to be suspended between and normally spaced from a pair of switch arms 77, 78, each of which are disposed, respectively, adjacent to but normally spaced from the opposite ends of the lever 72.

The microswitch 71 also includes a pair of spaced terminals 79, 80 to which one end of the switch arms 77, 78, respectively, are connected. The other ends of the switch arms 77, 78 normally engage, respectively, the fixed switch contacts 81', 81, the latter being connected together by a wire 82. A pair of fixed switch contacts 83, 84 are also carried by the microswitch 71 and are disposed on the opposite sides of the switch arms 77, 78, with respect to the switch contacts 80, 81, and are normally in their respective open condition.

One side or 70B of the battery 70 is connected through wires 85 and 86 to the wire 82. The switch contacts 83 and 84 connect through wires 87 and 88, respectively, with wire 89 which is also connected to the terminal 70A of the battery 70. The wiring of the microswitch 71 is completed by connecting one end of the wire 90 to the terminal 79 and the other end thereof to one side of the armature (not shown) of the reversing motor 48; and by connecting one end of the wire 91 to the terminal 80, the other end of the wire 91 being connected to the other side of the armature (not shown) of the motor 48.

Thus, from the foregoing description it will be understood that with the switch arms 77, 78 in their normally closed position against the switch contacts 80, 81 the armature of the motor 48 is short circuited. Should, however, the servomotor be energized to rotate, for example, in a clockwise direction, the lever 72 swings against the switch arm 77 to break its contact with the switch contact 80 and to close the switch arm against the switch contact 83. The armature of the motor 48 is thus energized to cause its rotation in one direction through the circuit which reads: from terminal 70A, wires 89, 87, contact 83, switch arm 77, terminal 79 to one side of the armature of the motor 48 through wire 90; from the other side of the armature through wire 91, terminal 80, switch arm 78, contact 81, wires 86 and 85 to terminal 70B of the battery 70.

Assuming now that the shaft 74 has turned in a counter-clockwise direction, the lever 72 is moved from its neutral position and engages against the switch arm 78 breaking its engagement with the switch contact 81 and closing it with the switch contact 84 thereby reversing the direction of the current through the armature of the motor 48 through the circuit which reads: from terminal 70A, wires 89, 88, switch contact 84, switch arm 78, terminal 80, and wire 91 to one side of the armature of the motor 48; from the other side of the armature through wire 90, terminal 79, switch arm 77, switch contact 81', and wires 82, 86 and 85 to the terminal 70B of the battery 70.

Rotation of the armature of the motor 48 in a clockwise or counter-clockwise direction will, of course, introduce a corresponding movement of the shaft 62 through the above-described driving means whereby the valve 64 will be actuated to turn the valve 64 toward its open or closed position.

Disposed within the pipe sections 18 and 38 are a pair of electrical heaters 110, 112, respectively, formed of a copper-nickel alloy called "cupron." Resistances 114 and 116 are positioned within the conduit 10 and discharge conduit 26, respectively, and are shown as being proximate the elbow connectors 16 and 22. Resistances 118 and 120 are disposed within the conduit 28 and the discharge conduit 46, respectively, and are illustrated as being proximate the elbow connectors 34 and 42.

In the disclosed circuity, a pair of variable transformers 126 and 127 are provided having variable contacts 128 and 129, respectively, mounted for adjustment along their associated windings 130, 131. Both transformers are energized from a conventional 110–115 volt 60 cycle A.C. source through a circuit which may be traced from wires 132, 133 to one side of the winding 130, through contact 128 and wire 134 to one side of the winding 131, and from the other side of the winding 131 through wire 135 to the other side of the A.C. line.

Transformer 126 controls the current flow through the heaters 110 and 112 in such a manner as to supply sufficient energy thereto to raise the temperature of the fluids passing therethrough substantially one degree. The controlling circuit for the heater 110 reads from wires 132, 133 winding 130, contact 128, wires 134, 136 to one side of the heater 110. The other side of the heater 110 connects to the other side of the A.C. line through wires 137, 138, and 135. The circuit energizing the heater 112 reads from wires 132, 133 to one side of the winding 130, through contact 128 and wire 134 to one side of the winding 131, from the other side of the winding 127 through contact 129 and wire 140 to one side of the heater 112; from the other side of the heater 112 through wires 141, 138 and 135 to the other side of the A.C. line.

It will now be readily understood that the function of the variable transformer 126 is to adjust the flow of current in accordance with the flow of oil past the heater 110, and that the function of the variable transformer 127 is to adjust the relation of the energy in heater 112 to that of 110 so as to produce the proper proportioning of the fluid flows.

The resistances 114, 116, 118 and 120 are pure nickel and are substantially identical and when at the same temperature have a resistance adjustment for an accuracy of $\frac{1}{100}$ of 1%. These resistances are connected in a conventional Wheatstone bridge circuit 121, as illustrated in Figure 2, the resistances 114, 116 being connected by wire 148, resistances 116, 120 being connected by wire 150, resistances 118, 120 being connected by wire 152, resistances 114, 118 being connected by wire 154, and the battery 70 being connected across the wires 148, 152 by wires 156, 158.

A conventional polarity-responsive amplifier 160 is driven by the 60 cycle line and is connected thereto by wires 162, 164. The input side of the amplifier 160 is connected across the bridge 121 by wires 166, 168 which tie into the wires 150, 154, respectively, of the Wheatstone bridge 121. With the bridge 121 in balance, no voltage is applied to the amplifier 160. If, however, the bridge is unbalanced, its voltage will be supplied to the amplifier in accordance with its polarity, and the output side thereof is utilized to energize the servomotor 75 through the pair of wires 174 and 176, the phase relation depending on the polarity of the bridge, to effect rotation of the shaft 74 in a clockwise or counter-clockwise direction. Movement of the shaft actuates the switch 71, as described above.

If desired, the battery 70 may be connected with a conventional charger 178 which is connected thereto by wires 180, 85 and 182, 89, the charger being energized through wires 184, 186 connected across the 60 cycle line.

Having described the component elements of the apparatus employed in this invention, a specific example of its utilization will be described.

Let it be assumed that a flow of approximately 22 gallons of crude oil per minute passes through the heater 110 and that the application of 1500 watts in the heater 110 will effect a rise in temperature of the oil one degree (1°), depending on the specific heat and density of the caustic solution, the application of approximately 317 watts applied to the heater 112 will raise the temperature of the caustic solution flowing therethrough one degree (1°), assuming a flow of approximately two gallons per minute. The desired proportional flow of the caustic solution with respect to the crude oil is achieved by adjustment of the variable transformer 127. The heating elements or coils 110, 112 formed of "cupron" have a negligible temperature coefficient of resistance, and therefore the heating effect of the two heaters on their respective fluids will be proportional to the wattage applied to each heater regardless of the absolute temperatures of the fluids.

Under the above-described conditions, the resistance 116 is one degree warmer than the resistance 114 and the resistance 120 will be one degree warmer than the resistance 118. By virtue of the Wheatstone bridge connection, it will be observed that as long as the percentage of increased resistance of resistance 116 over resistance 114 is the same as the increased resistance of resistance 120 over 118, the bridge circuit 121 is in balance, and no voltage is applied to the amplifier. The bridge resistors may be formed of No. 26 pure nickel wire, which is practically non-corrosive and has a high temperature coefficient of resistance. The resistance value of each of the resistances 114, 116, 118 and 120 is, in this embodiment, 36 ohms.

Having assumed that the desired proportion of the flow of the caustic solution with respect to the oil has been determined by adjustment of the variable transformer 127, if the actual rate of flow of the caustic deviates by increasing or decreasing one-quarter of one percent from this value, the bridge 121 will be unbalanced, and the voltage appearing across the wires 150, 154 is applied to the amplifier. Let it be assumed that the flow of the caustic solution has increased. The current generated by the amplifier is then supplied to the pair of wires 174, 176 to drive the servo-motor 75.

The servo-motor 75 is of a conventional type well known in the art and consequently only a brief description thereof will be herein presented. The servo-motor 75 is, in effect, a two phase A.C. motor having two separate windings (not shown). One winding is connected to the amplifier 160 by the wires 170, 172, with the effect that one winding of the servo-motor 75 is continuously energized by the 60 cycle, alternating current from within the amplifier 160, and contained within the circuit just described is a capacitor (not shown) which changes the phase relation of the first field winding of the servo-motor 75 so that it is practically 90 electrical degrees out of phase with respect to alternating current that is fed into the amplifier.

Wires 174, 176 connect the other field winding (not shown) and are connected in the amplifier 160 to the 60 cycle current which has been produced within the amplifier by converting the unbalanced D.C. current from wires 166, 168 to 60 cycle alternating current and amplifying it and determining its phase relation to the steadily energized field in accordance with the polarity of the D.C. voltage in wires 166, 168. This phase relation causes the shaft 74 of the servo-motor 75 to rotate in one direction or the reverse with attendant actuation of the switch 71.

Assuming that the servo-motor 75 has been energized due to the unbalance of the bridge 121 and the shaft 74 rotates in a clockwise direction, the lever 73 will then swing clockwise to effect movement of the arm 72 outwardly and into engagement with contact 83. The armature of the motor 48 is energized through the circuit reading the battery terminal 70A, wire 89, wire 87, contact 83, arm 77, terminal 79 and wire 90 to one side of the armature. From the other side of the armature through wire 91 to terminal 80 and arm 78, the switch contact 81 and wires 82, 86 and 85 to the other terminal 70B of the battery 70.

As is illustrated in the accompanying drawing, under normal conditions the field (not shown) of the direct current motor 48 is constantly energized through wires 66, 68 from the battery 70. The armature of the motor 48 is connected to the switch arms 77, 78 through the terminals 79, 80 and wires 90, 91, and under normal conditions the armature is short circuited by contacts 81', 81 and wire 82. Now, any rotation of the armature causes generation of current in the armature conductors which effects a relatively powerful braking action so that when the lever 73 returns the lever 72 to its normal position the armature stops quickly thereby preventing it from overrunning.

The friction clutch 76 is provided to prevent injury to the microswitch 71 or to the servo-motor 75.

Assuming now that the valve 64 has been actuated in a manner to restore the proper proportioning between the two fluids, the bridge 121 is again balanced and the servo-motor returns to its normal position. Switch arm 77 returns to the position shown thus breaking the circuit to the motor 48 at switch contact 83.

It will be understood that if the caustic flow decreases from the pre-set norm, the bridge voltage is applied to the amplifier 160 and its current is supplied to the servo-motor 75 through wires 174, 176. The lever 72 is then swung counterclockwise to establish a current flow through the armature of the motor 48 in the reverse direction. This latter circuit reads: from terminal 70A, wires 89, 88, switch contact 84, arm 78, terminal 80 and wire 91 to one side of the armature. From the other side of the armature the current flows through wire 90, terminal 79, arm 77, contact 80, wire 82, and wires 86, 85 to battery terminal 70B. Restoration of the proportional value desired of the rate of flow of the caustic will effect a rebalance of the bridge 121, and the lever 72 will return to neutral, thereby breaking the armature circuit at contact 84.

Thus, by the way of a summary, it is seen, in this given example, that if the flow of the caustic solution be greater with relation to the flow of oil than the amount determined by the setting of the variable transformer 127, the rise of temperature of the caustic will not be as great as the rise in temperature of the oil, and therefore the resistance of resistance 120 with respect to the resistance of resistance 118 will be less than the resistance of resistance 116 with respect to resistance 114, and the resultant voltage is applied to the amplifier 160, the voltage being amplified approximately four million times, and the amplified voltage appears at the terminals of the servo-motor 75 and causes it to rotate through a sufficient angle to actuate the reversing switch 71. The actuation of the switch 71 closes a battery circuit to the armature of the motor 48 which acts through the speed reducer 60 to actuate the valve 64 in such a direction as to reduce the flow of caustic to such a point that the relation of the resistances 120 to 118 is again the same as the relation of the resistances 116 to 114, thereby balancing the bridge 121 and with the removal of the voltage from the amplifier, the servo-motor 75 resumes its neutral position, and the valve operating motor 48 stops.

Through the use of high-ratio transformers 95.31 percent efficiency has been obtained in the use of this apparatus and 95.61 percent efficiency was obtained through the usage of low-ratio transformers.

In this invention, the elbow connectors serve a special purpose, namely the prevention of the heat of radiation from reaching the resistances 114, 116, 118, and 120. If desired, special reflective barriers could be employed.

The described proportioning device may be applied to other fields than that described above. For example, it could be used as a control of air and fuel fed to oil burners, in the proportioning of fluids in the catalytic cracking of petroleum, the control of the fluid components in the synthesis of hydrocarbons, the addition of chlorine in water treatment, the addition of eggs, oil, and vinegar to mayonnaise, and in many other manners.

Having described and illustrated one embodiment of this invention, it will be understood that the same is offered merely by way of example, and that the invention is to be limited only by the scope of the appended claims.

I claim:

1. Apparatus for automatically controlling the volume ratio of flows of two fluids flowing through individual conduits, said apparatus comprising an electrical heating element disposed within each of said conduits, a normally balanced Wheatstone bridge having a pair of resistances disposed within each of said conduits adjacent said heating elements, said resistances being positioned on opposite sides of their said adjacent heating elements, preset valve control means disposed in one of said conduits, means electrically connected with said bridge and mechanically connected with said control means to effect operation of said control means when said bridge is unbalanced, and variable transformer means for energizing said heating elements and for adjusting the energization of said heating elements relative to each other in accordance with a preselected proportional flow rate.

2. Apparatus for automatically controlling the volume ratio of flows of two fluids through individual conduits, said apparatus comprising a normally balanced Wheatstone bridge having a pair of its resistances disposed in each of said conduits, an electrical heating element disposed in each of said conduits intermediate each of said pairs of resistances, variable transformer means for energizing each of said heating elements and for adjusting the energization of said heating elements relative to each other, valve-control means disposed in one of said conduits, and means connected with said valve-control means to effect its operation in response to an unbalanced condition of said bridge.

3. Apparatus for automatically controlling the volume ratio of flows of two fluids through individual conduits, said apparatus comprising a valve disposed in one of said conduits, an electric motor for operating said valve, a normally balanced Wheatstone bridge having a pair of its resistances disposed in each of said conduits, an amplifier connected to said bridge, an electric circuit for said motor including a switch, means operable by said amplifier to effect the opening and closing of said switch, said amplifier being operable upon the appearance of voltage across said bridge, a heating element disposed in each of said conduits intermediate said pairs of resistances, and variable transformer means for energizing said heating elements and for adjusting the energization of said heating elements relative to each other.

4. Apparatus for automatically controlling the volume ratio of flows of two fluids through individual conduits, each of said conduits having a pair of laterally-offset longitudinal end portions having their respective adjacent ends connected to the opposite ends of an intermediate conduit section, a normally balanced Wheatstone bridge having a pair of its resistances disposed within each of said pairs of offset end portions of said resistances being disposed within said adjacent ends of each pair of said adjacent end portions, a polarity-responsive electrical reversing system connected across said bridge, a reversible switch operably connected with said system, an electrical heating element disposed within each intermediate conduit section, variable transformer means controlling the energization of said elements relative to each other, valve means disposed within one of said conduit end portions, and means for opening and closing said valve, said last named means including a reversible electric motor connected with said valve and a series electric circuit including said switch.

5. Apparatus for automatically controlling the volume ratio of flows of two fluids through individual conduits, each of said conduits having a pair of offset portions connected by an intermediate section, an electrical heating element in each of said intermediate sections, a variable transformer for controlling the energization of both of said elements, a second variable transformer for controlling the energization of one of said elements independently of the other, a normally balanced Wheatstone bridge having one of its resistance elements respectively disposed within each of said offset end portions, a valve connected in one of said offset portions, electrical means to effect operation of said valve, and a polar-reponsive electrical reversing system connected across said bridge and to said last-named means for effecting operation of said valve.

6. Apparatus for automatically controlling the volume ratio of flows of two fluids through individual conduits, each of said conduits of said apparatus comprising a pair of spaced and laterally offset pipes, an intermediate pipe section disposed between the adjacent ends of said pair of pipes and being positioned substantially at right angles relative thereto, an elbow connector joining one end of said intermediate pipe section with said adjacent end of one of said pair of pipes, a second elbow connector connecting the other end of said intermediate pipe section with said adjacent end of the other one of said pair of pipes, a normally balanced Wheatstone bridge having a pair of its resistances disposed in each of said conduits with one of each of said pairs of resistances disposed within said adjacent ends of said pairs of pipes, an electrical heating element disposed in said intermediate pipe section of each of said conduits, a variable transformer connected to control the energization of both of said heating elements to adjust the system for a selected flow condition, a second variable transformer for controlling the energization of one of said heating elements independently of the other to set the ratio of flow through the two conduits, a reversible electric-motor-controlled valve disposed in one pipe of one of said pairs of pipes, an electric circuit for said motor including a reversing switch, a servo-motor connected with said switch to effect the operation thereof, an amplifier connected across said bridge, said amplifier being responsive to voltage appearing across said bridge upon the unbalancing thereof and said amplifier having the output side thereof connected with said servo-motor to effect the energization thereof and the consequent operation of said reversing switch.

7. In a system for automatically controlling the volume ratio of flows of two fluids flowing through respective conduits wherein a valve is disposed in one of said conduits for controlling the flow of fluid therethrough, an electrical heating element is disposed in each of said conduits, temperature-sensing means are provided in said conduits in spaced relation to said heating elements, and means responsive to said temperature-sensing means are provided to actuate said valve to open and close said valve in response to a deviation from a preselected flow condition, the improvement comprising a variable transformer connected to control the energization of both of said heating elements to adjust the system for a selected flow condition, and a second variable transformer for controlling the energization of one of said heating elements independently of the other to set the ratio of flow through the two conduits to a preselected value.

8. Apparatus for automatically controlling the volume ratio of flows of two fluids through individual conduits, comprising: a valve disposed in one of said conduits; a reversible electric motor for opening and closing said valve; an electrical heating element disposed in each conduit; variable transformer means for energizing each of said heating elements and for adjusting the energization of said heating elements relative to each other; a normally balanced Wheatstone bridge having a pair of its resistances disposed in each of said conduits on either side of the respective heating elements; a polarity-responsive amplifier connected to said bridge; an electrical circuit for said reversible motor including a reversing switch, said reversing switch having a first position for de-energizing said electric circuit to said motor, a second position for establishing current flow through said electric circuit to said motor in one direction, and a third position for establishing current flow through said electric circuit to said motor in the opposite direction; a servo motor mechanically connected to said switch and electrically connected to said amplifier, whereby said servo motor is responsive through said amplifier to bridge unbalance to drive said switch from said first position to said second or third positions depending upon the polarity established by the bridge unbalance to energize said reversible motor in a manner actuating the valve in said conduit in a direction to reestablish a balanced relation.

References Cited in the file of this patent

UNITED STATES PATENTS

| | | |
|---|---|---|
| 1,767,588 | Hutton | June 24, 1930 |
| 2,214,864 | Stonehill | Sept. 17, 1940 |
| 2,559,090 | Potter | July 3, 1951 |